3 Sheets--Sheet 1.

J. B. BUSHNELL.
Seeding-Machine.

No. 164,635.  Patented June 22, 1875.

WITNESSES
Thomas J. Godwin
Joseph Forrest

INVENTOR
John B. Bushnell,
Theodor Munger.
Attorney

THE GRAPHIC CO. PHOTO-LITH. 39 & 41 PARK PLACE, N.Y.

3 Sheets--Sheet 2.
J. B. BUSHNELL.
Seeding-Machine.
No. 164,635. Patented June 22, 1875.
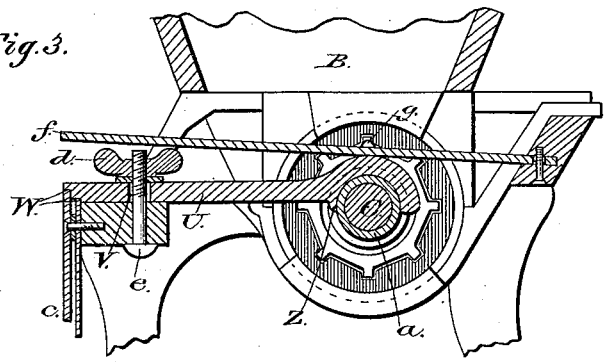
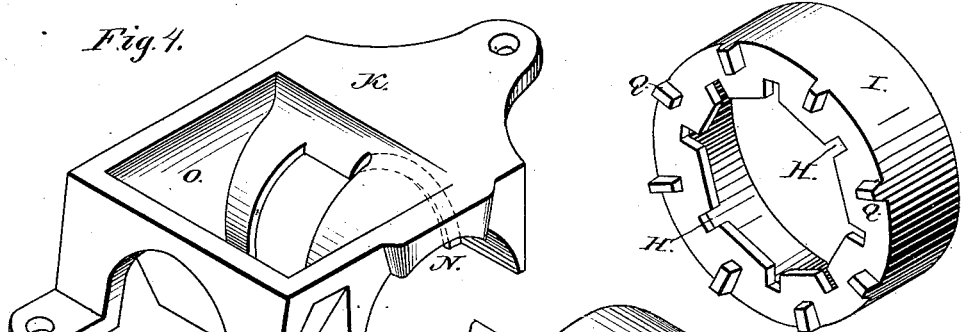
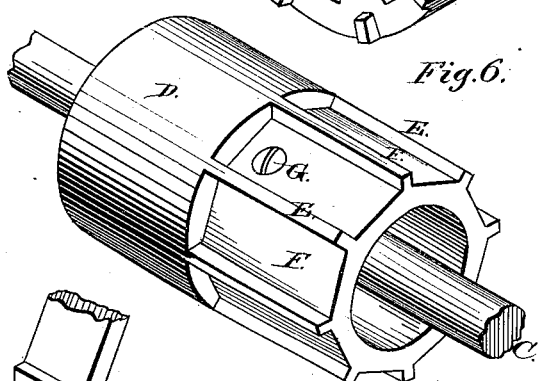
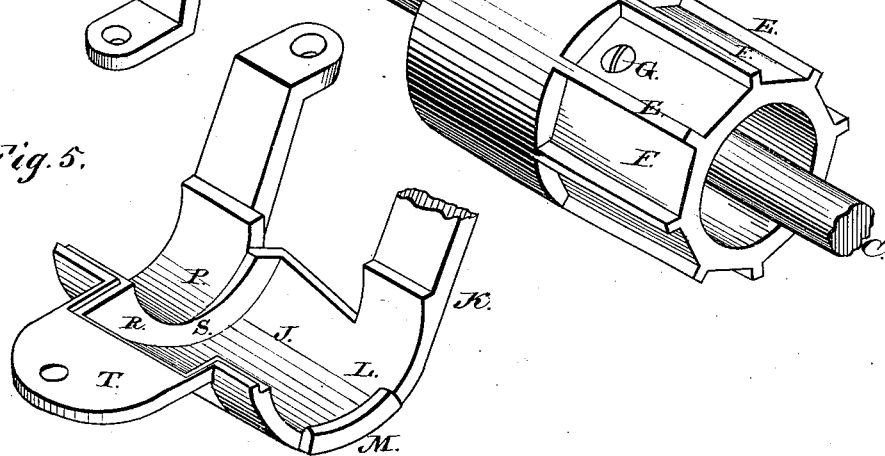
WITNESSES
Thomas J. Godwin
Joseph Forrest
INVENTOR
John B. Bushnell,
Theodor Mungen
Attorney
THE GRAPHIC CO.PHOTO-LITH.39 & 41 PARK PLACE,N.Y.

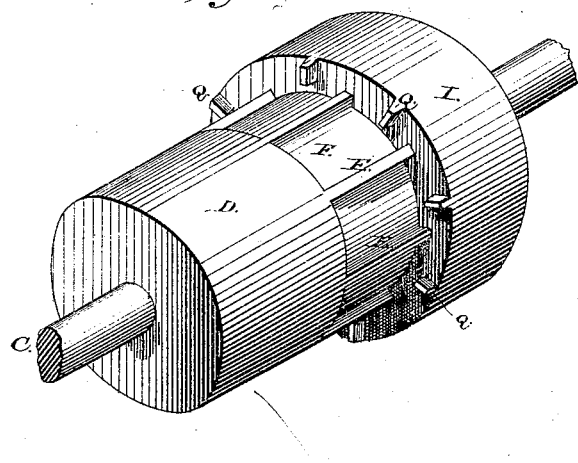

UNITED STATES PATENT OFFICE.

JOHN B. BUSHNELL, OF FOND DU LAC, WISCONSIN.

IMPROVEMENT IN SEEDING-MACHINES.

Specification forming part of Letters Patent No. 164,635, dated June 22, 1875; application filed May 13, 1875.

*To all whom it may concern:*

Be it known that I, JOHN B. BUSHNELL, of Fond du Lac, in the county of Fond du Lac and State of Wisconsin, have invented certain new and useful Improvements in Seeding-Machines; and I hereby declare the following to be a full, clear, and exact description of the same, reference being had to the accompanying drawings, making a part of these specifications, in which—

Figure 1:
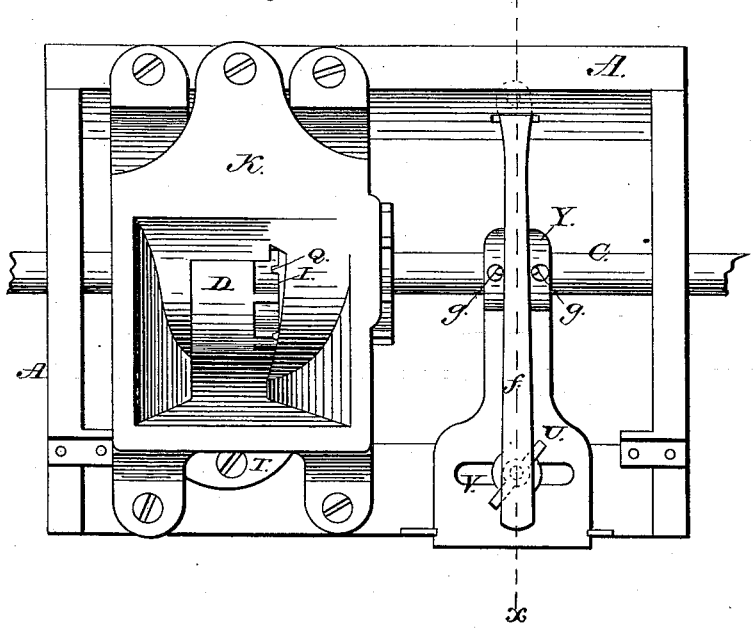
Figure 2:
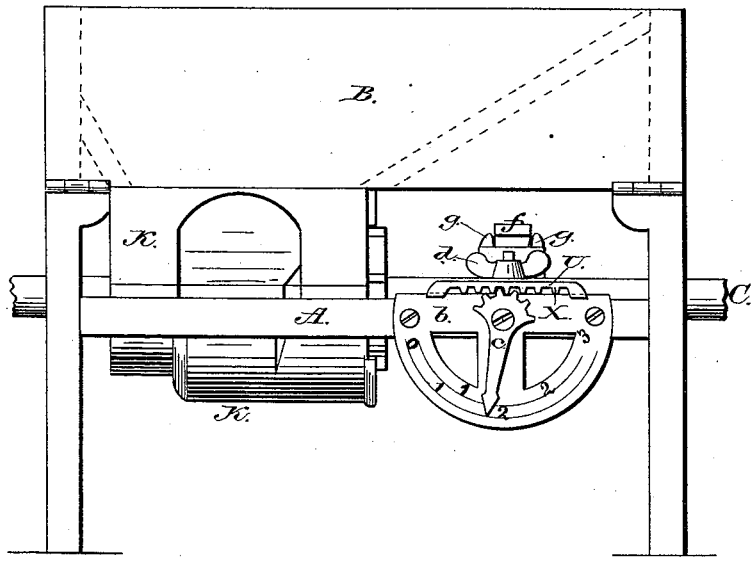

Figure 1 is a plan view of a portion of a machine embodying the improvements in my invention. Fig. 2 is a rear elevation of the same. Fig. 3 is a transverse sectional view taken through the line $x\,x$, Fig. 1. Fig. 4 is a perspective view of the upper portion of the seed cup or case which incloses the cylinders. Fig. 5 is a similar view of the lower portion of said case. Fig. 6 shows detached views of the cylinder and the annular rim or hollow cylinder. Fig. 7 is a perspective view of a modification of my invention.

This invention relates to an improvement in that class of seeding-machines known as force-feed seeding-machines; and consists, first, in providing a seeding-machine with a combined horizontal and vertical force-feed, consisting of a cylinder of two different diameters, the larger diameter being provided with vertical radial flanges or projections upon its grain-face, and the smaller diameter provided with horizontal flanges upon its exterior surface, with recesses between the flanges, for the purpose of accurately measuring the quantity of seed to be sown to the acre by subjecting it to a uniform vertical and lateral pressure during a part of its passage to and just prior to its discharge. Secondly, it consists of a cylinder provided with horizontal longitudinal flanges, having recesses between them, and made longitudinally adjustable within an annular rim or hollow cylinder, provided with radial flanges or projections upon its inner vertical face, and arranged within a seed cup or case, the object being to produce an adjustable combined horizontal and vertical force-feed. Thirdly, in constructing the lower portion of the seed cup or case of such form that its central interior surface will converge from the front downwardly to its longitudinal center, and a shoulder near one end will converge inwardly and laterally from the longitudinal center of said lower portion to the point of discharge, so as to form a channel beneath the cylinder next to the face of the annular rim or hollow cylinder, in which the grain will be acted upon by a double compression, both laterally and vertically, in its course to the point of discharge, for the purpose of effecting a uniform discharge, and thereby insuring an exact measurement of the grain. Fourthly, it consists of a dial-plate, secured to the frame of the machine in such a manner that its upper edge will project slightly above the horizontal face of that portion of the frame to which it is attached, and enter a groove in the under face of an adjusting-arm connected to the adjustable driving-shaft at one end, and adjustably secured to the frame of the machine at the other end by a bolt or other suitable device, for the purpose of forming a guide or way upon which the adjusting-arm may move, and also of preventing lateral motion of the driving-shaft when the adjustable arm has been secured. Fifthly, of a semicircular dial-plate, secured to the frame of the machine parallel with the driving-shaft and having its straight edge projecting slightly above the horizontal face of that portion of the frame to which it is attached, and entering a groove in a slotted and serrated adjusting-arm connected to the driving-shaft at one end, and secured to the frame at the other end by a bolt or other suitable device, and engaging with the serrated base of an indicating-finger, for the purpose of adjusting the seeding mechanism to increase or diminish the quantity of seed to be sown, and of indicating the quantity to be sown to the acre at each adjustment of the parts.

In the accompanying specifications similar letters of reference indicate like parts.

The frame A of the machine has a hopper, B, hinged to the side thereof. An adjustable driving-shaft, C, traverses the frame A longitudinally. A cylinder, D, having horizontal flanges E and recesses F is mounted loosely upon the adjustable driving-shaft C, and secured thereto by a set-screw, G, or in any other suitable manner. The flanges E enter recesses H in the inner vertical face of an annular rim or hollow cylinder, I. The projections between the recesses H fit the recesses F in the cylinder D. The inner vertical face of the hollow cylinder I is provided with radial flanges or projections 2. The lower portion of the seed-cup or case K is secured to the frame, and the hollow cylinder I rests in the portion L, where it is held from moving laterally in one direction by a flange, M, upon the lower portion J of the case K, and is prevented from moving laterally in the other direction by a flange, N, upon the upper portion O of the case K. The cylinder D rests in the portion P in the lower part J of the case K, and when the upper portion O is placed over the cylinder D and hollow cylinder I they have no vertical play, but may be revolved within the case K. The lower portion J of the case K is provided with a shoulder, R, near one end, which converges inwardly and laterally from its longitudinal center or point S to the point of discharge, and the portion between the shoulder R and the vertical face of the hollow cylinder I converges downwardly from the inner edge of the ear T to its longitudinal center, or in line with the point S, in order that when the cylinder D is in place a channel will be formed beneath it, in which channel the grain will be acted upon by a double compression—that is to say, the flanges E on the face of the cylinder D will compress it vertically when it arrives in line with the point S, and the converging portion of the shoulder R will compress it laterally against the vertical face of the hollow cylinder I from the point S to the point of discharge, thus insuring a uniform discharge, and an accurate measurement of the grain. The double compression is omitted above the longitudinal center of the lower portion J of the case K, in order to admit to that point all the grain possible. From the longitudinal center or point S the shoulder R converges toward the vertical face of the hollow cylinder I, in order to insure a more even discharge of the grain when sowing the minimum quantity. An arm, U, having an enlarged end provided with a slot, V, groove W, and serrations X at one end, is connected at the other end by a yoke, Y, having a rib, Z, on its under face to a grooved collar, a, upon the adjustable driving-shaft C. The groove W in the arm U receives the straight edge of a semicircular dial-plate, b, secured to the frame of the machine exactly parallel with the adjustable driving-shaft C, and having its upper or straight edge projecting above the horizontal face of that portion of the frame to which it is secured. The serrations X are made upon the under face and edge of the enlarged end of the arm U, and engage with the serrated base of an indicating-finger, c. The enlarged end of the arm U is secured to the frame A by a bolt, e, passing up through the slot V in the arm U with a thumb-nut and washer d on top. A lever, f, with its fulcrum in the front side of the frame A, passes between two studs, g g, upon the yoke Y, and extends to the rear of the frame A. The adjustable driving-shaft C does not form the bearings for the cylinders D and I, but they have surface bearings in the seed cup or case K.

The hole in the cylinder D is made larger than the shaft C, and the said cylinder D is secured to the shaft C by set-screws, rivets, or other suitable device.

The adjustable driving-shaft C can be adjusted by loosening the thumb-nut d and operating the lever f. The adjustment of the shaft C effects the adjustment of the cylinder D, and the limit of the adjustment is the length of the flanges E upon the cylinder D. When the cylinder has been moved to the left to its maximum extent the greatest quantity of seed will be sown, and the indicator will register the quantity accurately.

When the cylinder D has been moved to the right to the farthest extent the smallest quantity of seed will be sown, and this quantity will also be accurately registered, and intermediate adjustments will sow greater or less quantities, as desired, and the amount sown to the acre at any adjustment will be accurately registered.

The radial flanges or projections Q upon the inner vertical face of the hollow cylinder I convert it into a vertical feed having a lateral or horizontal force or compression. The horizontal flanges E upon the cylinder D convert it into a horizontal feed having a vertical compression, and the two combined furnish the combined vertical and horizontal force-feed. The groove W in the enlarged end of the arm V fits nicely upon the straight edge of the semicircular dial-plate b, being exactly parallel with the driving-shaft C. No play is given to the adjusting mechanism, hence the accuracy with which the adjustment is effected.

The cylinder D and the hollow cylinder I may be used in combination with a driving-shaft which is not adjustable laterally, in which case they may, if preferred, be cast together in one piece, and the quantity of seed sown be varied by any suitable device for driving the shaft at different speeds with relation to ground passed over.

Having thus described my invention of improvements, what I claim as new and useful, and desire to secure by Letters Patent, is—

1. In a seeding-machine, a combined horizontal and vertical force-feed, consisting of a cylinder of two different diameters, the larger portion being provided with vertical radial flanges or projections upon its grain-face, and the smaller portion being provided with horizontal flanges upon a portion of its exterior surface, with recesses between said flanges, substantially as and for the purpose set forth.

2. The cylinder D, provided with the horizontal flanges E and recesses F, and adapted to be adjusted longitudinally with the driving-shaft C, in combination with the annular rim or hollow cylinder I, having the radial flanges or projections Q and recesses H, substantially as and for the purposes set forth.

3. The lower portion of the seed cup or case

K, having the shoulder R, which converges inwardly and laterally from its center or point S to the point where the seed is discharged, and also having its concave interior surface converging from the upper inner edge downwardly to its longitudinal center, or in line with the point S, in combination with the cylinder D and hollow cylinder I, substantially as and for the purposes set forth.

4. The dial-plate $b$, secured to the frame A parallel with the driving-shaft C, and having its upper edge adapted to form a guide for the adjusting-arm U, in combination with the adjusting-arm U, adjustably secured to the frame A and connected to the driving-shaft C, substantially as and for the purposes set forth.

5. The semicircular dial-plate $b$, provided with the finger $c$ and secured to the frame A, parallel with the driving-shaft C, and having its straight edges projecting above the horizontal face of that portion of the frame to which it is attached, in combination with the adjusting-arm U, provided with the slot X, groove W, yoke Y, and rib Z, secured to the frame A, connected to the driving-shaft C, and provided with the lever $f$, substantially as and for the purposes set forth.

In testimony that I claim the foregoing improvements as above described, I have hereunto set my hand and seal this 12th day of May, 1875.

JOHN B. BUSHNELL. [L. S.]

Witnesses:
  THEODORE MUNGEN,
  JOSEPH FORREST.